Patented June 6, 1933

1,913,127

UNITED STATES PATENT OFFICE

IWAN OSTROMISLENSKY, OF NEW YORK, N. Y., ASSIGNOR, BY MESNE ASSIGNMENTS, TO THE NAUGATUCK CHEMICAL COMPANY, OF NAUGATUCK, CONNECTICUT, A CORPORATION OF CONNECTICUT

NONSHATTERING GLASS AND METHOD OF MAKING THE SAME

No Drawing. Application filed February 15, 1928, Serial No. 254,614. Renewed October 27, 1932.

This invention is an improvement in nonshattering glass and methods of making the same, and more particularly in glass strongly resistant to stresses of every character, and especially to those tending to separate the fragments when the glass is broken.

Glass sheets of usual construction are relatively fragile, and tend to disintegrate into fragments when broken. The same stress which breaks the glass tends to drive the fragments apart from which injury frequently results to persons or to objects near the breakage.

The polymers of phenyl-acrylic acid esters, their homologues and analogues display plastic properties, and in pure condition they are colorless and as transparent as mineral glass, and display a high refractive index. This condition of clear colorless transparency is permanent, even after many years exposure to direct sunlight.

The homologues and analogues may be obtained by heating the corresponding monomer. Thus, in particular, they may be obtained from amyl, amylene, isophopyl, butylene, and isobutylene esters of phenyl-acrylic acid.

Polymerization may be carried out by exposure of the esters to light, either sunlight or that of a mercury lamp, or by heating. A convenient method of obtaining the polymers is by adding to the esters a liquid in which its polymers have the properties to dissolve or to swell and then subjecting said mixture to the sunlight or the ultra violet rays. As a suitable liquid one can use chlor-benzol, ethylene bromide diphenylmethan, etc. One can add such a liquid ester before the polymerization of given esters of phenylacrylic acid or polymer.

Or the process of polymerization may be left incomplete, in which case, of course, the corresponding monomers are present, and a physically homogeneous amorphous mass results, as transparent as glass, entirely colorless, and possessing the property of adhering closely and securely to the surface of mineral glass.

The polymerized esters so treated are utilized by covering a sheet of mineral glass with a coating of the polymers and afterwards superposing upon the first sheet a second sheet with pressure, if desired. Further sheets of glass may be added in the same manner if more than two thicknesses of glass is desired.

When an incompletely polymerized phenyl-acrylic acid ester is used, prolonged exposure to sunlight will convert the remaining monomer, for the greater part, into the corresponding polymer.

Example 1

Onto a sheet of glass of suitable area, and approximately 0.2 cm. thick, a layer of amylen-ester of polymerized phenyl-acrylic acid of suitable consistency is poured continuously and carefully, and as evenly as possible, so as to cover the whole of the surface. A part of the liquid contents of the mass is allowed to evaporate by leaving the sheet open to the access of air for a suitable period, say, from two to twelve hours. Thereafter the layer of polymers is carefully covered with a second glass sheet of the same size, and the sheets are pressed together, preferably over the entire surface, under a pressure of ⅛ of an atmosphere.

Example 2

The surfaces of a sheet of mineral glass, as described in Example 1, is covered with a coating of completely polymerized amylenester of phenyl-acrylic acid, their homologues or analogues, with an admixed corresponding monomer, which may result from incomplete polymerization, and a second sheet of glass is laid upon the coating and subjected to a certain pressure. The resulting article is then kept at room temperature, or heated to from 60 to 70° C. depending upon the stability of the mineral glass used, until the glass becomes optically homogeneous.

What is claimed as new is:—

1. As a new article of manufacture, a plurality of sheets of mineral glass adhesively joined by an interposed relatively thin layer of polymerized phenyl-acrylic acid esters.

2. The process of making nonshatterable glass, which consists in directly connecting a plurality of sheets of mineral glass by an interposed layer of amylen-ester of polymerized phenyl-acrylic acid, and exposing the connected sheets to sunlight.

3. The process of making nonshattering glass which comprises covering a surface of a sheet of glass with a layer of amylen-ester of polymerized phenyl-acrylic acid, exposing the same to access of air and thereafter placing a second sheet of glass against said layer and pressing the sheets of glass together.

4. The process of making nonshattering glass which comprises covering a surface of a sheet of glass with a coating of completely polymerized phenyl-acrylic acid with an admixed corresponding monomer, placing a second sheet of glass against said coating and subjecting the same to pressure and subjecting the resulting article to substantially constant temperature until the glass becomes optically homogeneous.

Signed at New York city in the county of New York and State of New York this 12th day of January A. D. 1928.

IWAN OSTROMISLENSKY.